(12) United States Patent
Dumont et al.

(10) Patent No.: US 9,525,721 B2
(45) Date of Patent: *Dec. 20, 2016

(54) CLIENT-SIDE AGGREGATION OF NESTED RESOURCE DEPENDENCIES

(71) Applicant: INTERNATIONAL BUSINESS MACHINES CORPORATION, Armonk, NY (US)

(72) Inventors: Charles E. Dumont, Pepperell, MA (US); Dan Dumont, Pepperell, MA (US)

(73) Assignee: International Business Machines Corporation, Armonk, NY (US)

(*) Notice: Subject to any disclaimer, the term of this patent is extended or adjusted under 35 U.S.C. 154(b) by 26 days.

This patent is subject to a terminal disclaimer.

(21) Appl. No.: 14/072,407

(22) Filed: Nov. 5, 2013

(65) Prior Publication Data

US 2014/0207848 A1    Jul. 24, 2014

Related U.S. Application Data

(63) Continuation of application No. 13/748,280, filed on Jan. 23, 2013, now abandoned.

(51) Int. Cl.
*G06F 15/16* (2006.01)
*H04L 29/08* (2006.01)
*G06F 9/445* (2006.01)

(52) U.S. Cl.
CPC .......... *H04L 67/10* (2013.01); *G06F 9/44521* (2013.01); *H04L 67/34* (2013.01)

(58) Field of Classification Search
CPC .......... H04L 67/42; H04L 67/10; H04L 67/34; G06F 11/302; G06F 2201/865
See application file for complete search history.

(56) References Cited

U.S. PATENT DOCUMENTS

| 8,156,213 | B1* | 4/2012 | Deng et al. | 709/223 |
| 8,473,607 | B2* | 6/2013 | Enscoe et al. | 709/224 |
| 2009/0031210 | A1* | 1/2009 | Backhouse | 715/234 |
| 2010/0223322 | A1 | 9/2010 | Mott et al. | |
| 2011/0302485 | A1 | 12/2011 | D'Angelo et al. | |
| 2012/0246618 | A1* | 9/2012 | Schatz | 717/122 |

(Continued)

OTHER PUBLICATIONS

Norris Boyd et al., "Rhino Javascript Compiler", Mozilla Developer Network and Individual Contributors, June 13, 2007, pp. 1-3, Retrieved Jan. 17, 2013.

(Continued)

*Primary Examiner* — Liangche A Wang
*Assistant Examiner* — Ayele Woldemariam
(74) *Attorney, Agent, or Firm* — Law Office of Jim Boice

(57) ABSTRACT

A computer-implemented method, system, and/or computer program product retrieves a nested resource. A client computer identifies software modules that are required by a primary software module. The dependent and primary software modules are consolidated at a client computer into an aggregated software module, which is a nested resource. A request for the aggregated software module is transmitted to a module server from a client-side module loader, which is incapable of identifying a name of received software modules from the module server. The client-side module loader in the client computer then receives the requested aggregated software module without any identification.

4 Claims, 3 Drawing Sheets

(56) References Cited

U.S. PATENT DOCUMENTS

2013/0167126 A1* 6/2013 Iyer et al. .................... 717/140

OTHER PUBLICATIONS

Anonymous, "Closure Tools: What is the Closure Compiler?", Google Developers, Jul. 2, 2012, pp. 1, Retrieved Jan. 17, 2013.
Wikipedia Contributors, "Dojo Toolkit", Wikipedia, The Free Encyclopedia, n.d., Page Version ID: 530988969, pp. 1-13, retrieved Jan. 23, 2013.
Wikipedia Contributors, "JQuery", Wikipedia, The Free Encyclopedia, n.d., Page Version ID: 534359230, pp. 1-14, retrieved Jan. 23, 2013.

* cited by examiner

CLIENT-SIDE AGGREGATION OF NESTED RESOURCE DEPENDENCIES

BACKGROUND

The present disclosure relates to the field of computers, and specifically to the use of computers when used for developing module-based software. Still more particularly, the present disclosure relates to requesting nested software modules.

A software framework ("framework") provides an organization for software. This organization includes generic functionality as well as user-modifiable functionality. The software framework includes compilers, libraries of software code, application programming interfaces (APIs), and tools sets that allow a user to combine different components into a program solution.

SUMMARY

A computer-implemented method, system, and/or computer program product retrieves a nested resource. A client computer identifies software modules that are required by a primary software module. The dependent and primary software modules are consolidated at a client computer into an aggregated software module, which is an exemplary nested resource. A request for the aggregated software module is transmitted to a module server from a client-side module loader, which is incapable of identifying a name of received software modules from the module server. The client-side module loader in the client computer then receives the requested aggregated software module without any identification.

DETAILED DESCRIPTION

Figure 1:
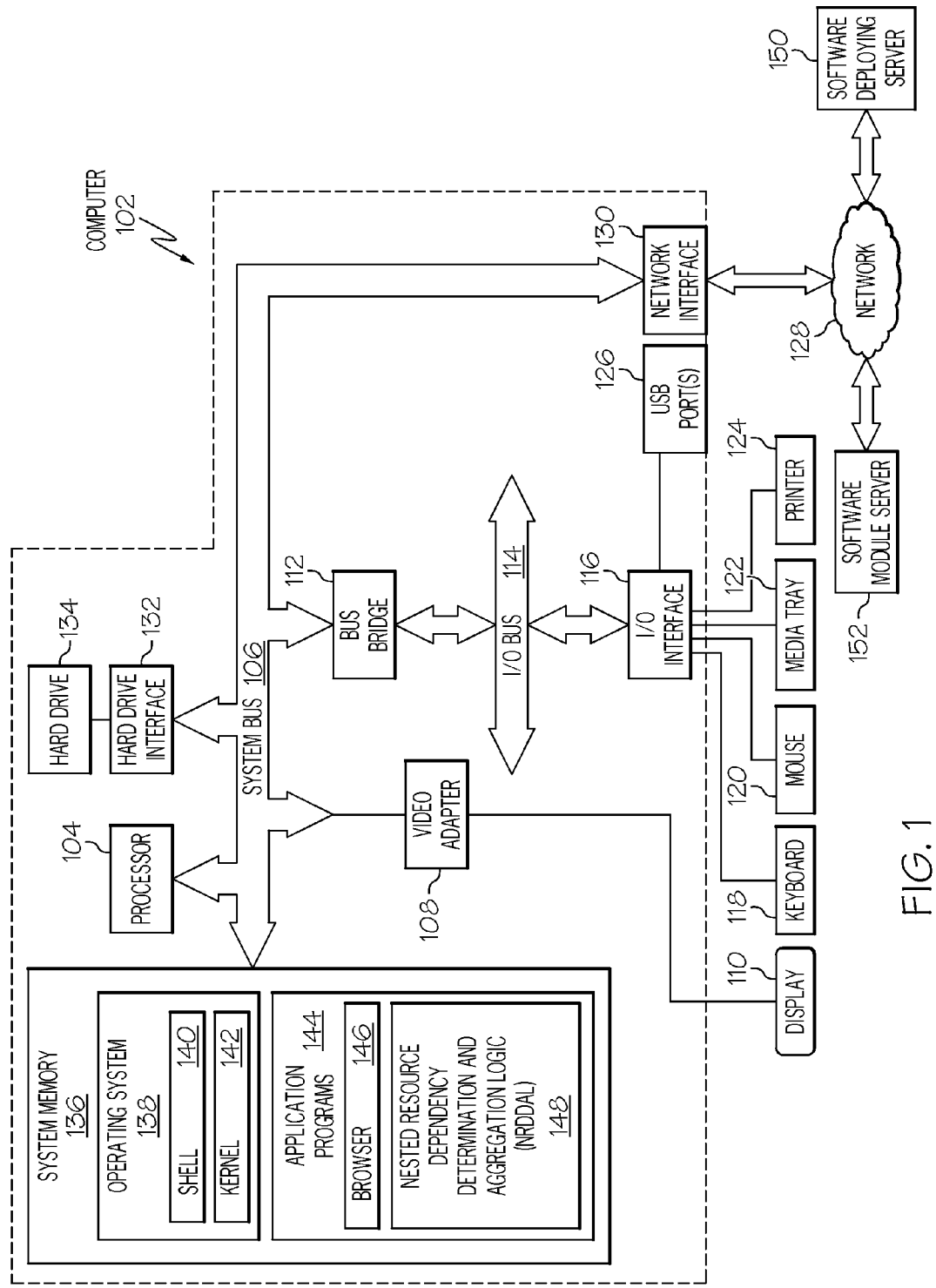
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As noted herein, a complex stream computer utilizes software and hardware components that interact with one another, such that a downstream component is reliant on an output from an upstream component in the complex stream computer. Thus, such systems are notoriously difficult to debug. That is, if the output of the entire stream computer fails, (i.e., if the output is an error code, is nonsense, is outside of an acceptable range, etc.), the upstream cause within the complex stream computer is difficult to identify by simply backtracking. The present invention presents a novel approach to identifying root causes in such cascade processes.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or software module server 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as software module server 152.

Application programs 144 in computer 102's system memory (as well as software deploying server 150's system memory) also include a Nested Resource Dependency Determination and Aggregation Logic (NRDDAL) 148. NRDDAL 148 includes code for implementing the processes described below, including those described in FIGS. 2-3. In one embodiment, computer 102 is able to download NRDDAL 148 from software deploying server 150, including in an on-demand basis, wherein the code in NRDDAL 148 is not downloaded until needed for execution. Note further that, in one embodiment of the present invention, software deploying server 150 performs all of the functions associated with the present invention (including execution of NRDDAL 148), thus freeing computer 102 from having to use its own internal computing resources to execute NRDDAL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Frameworks ("software frameworks") for javascript applications typically implement functionality in a number of separate javascript source files that need to be loaded on the client by a client-side module loader, such as a web browser. The frameworks implement a loader component that the application code loads into the application, and then the loader requests the modules of the framework that are needed in order to implement the functionality that is required by the application. However, the client-side module loader is unable to identify what modules are returned. That is, under the Asynchronous Module Definition (AMD) specification, the client-side module loader simply assumes that whatever module it requested will be returned, without adding any other modules. For example, assume that the client-side module loader requests a software module named "alpha". However, when a module server receives the request, it determines that the software module "alpha" also needs dependent software modules "dep1" and "dep2" in order to function, and thus returns the dependent software modules "dep1" and "dep2" to the client-side module loader. However, the client-side module loader is only expecting the software module "alpha", and thus there is often a system malfunction when software modules "dep1" and "dep2" are also returned.

Figure 2:
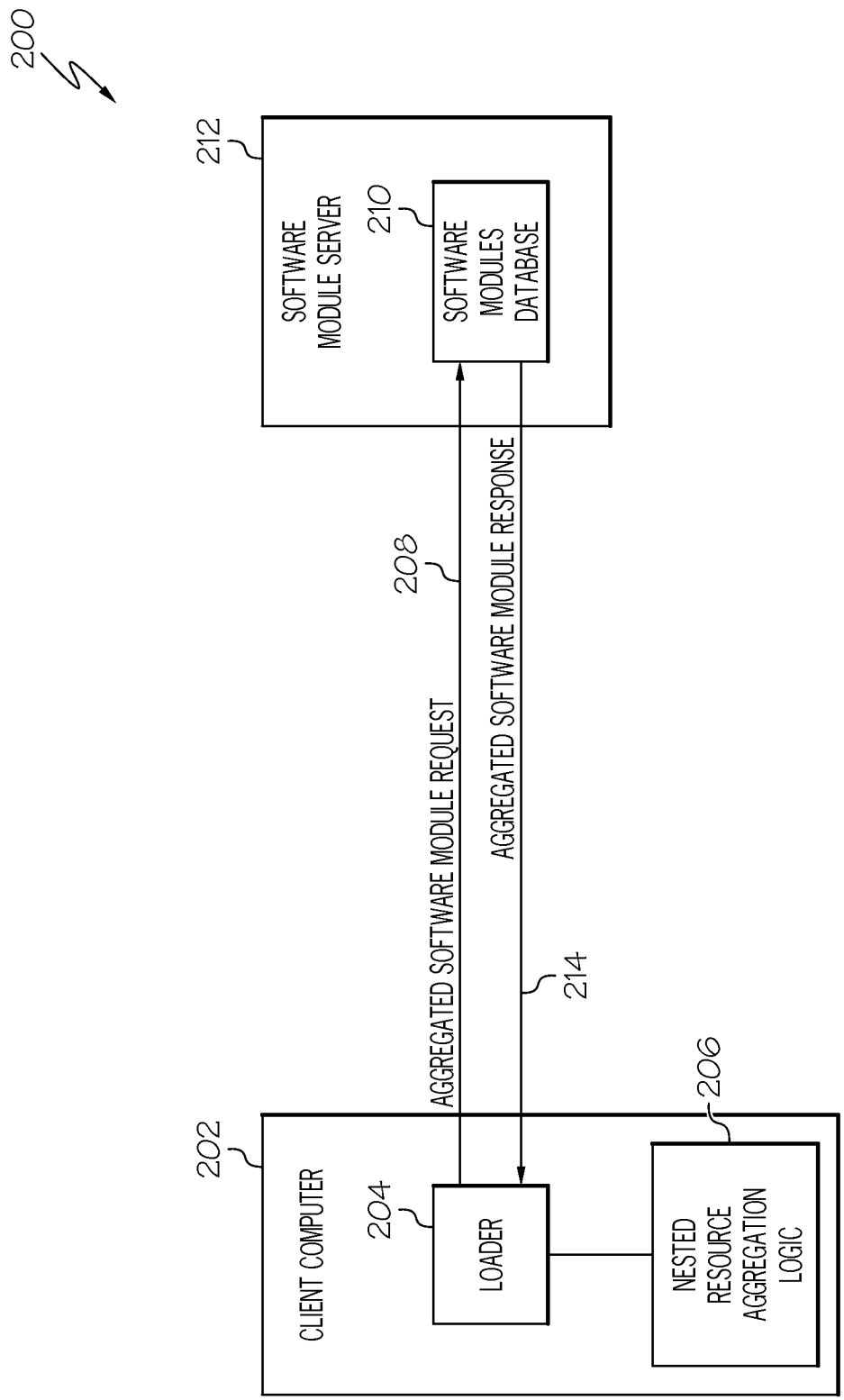
FIG. 2 illustrates an exemplary system for requesting and receiving aggregate modules as described herein.

With reference now to FIG. 2, an exemplary system 200 for requesting and receiving aggregate software modules as described herein is presented. A client computer 202 (e.g., computer 102 depicted in FIG. 1) includes a client-side software module loader ("loader 204"). Associated with loader 204 is a nested resource aggregation logic 206, which may be part of the NRDDAL 148 depicted in FIG. 1. In response to the client computer requesting a primary software module (e.g., "alpha"), the loader 204 will send an inquiry to the nested resource aggregation logic 206 to determine if there are any dependent software modules that "alpha" will require in order to execute properly. If there are any such dependent software modules, then the nested resource aggregation logic 206, along with the loader 204, will combine (consolidate) the primary software module ("alpha") with the dependent software modules ("dep1" and "dep2") to generate an aggregated software module, which is a nested resource of software modules. A request for this aggregated software module is sent, via an aggregated software module request 208, to a software modules database 210 within a software module server 212 (e.g., software module server 152 shown in FIG. 1). The software module server 212 then returns the requested aggregated software module in an aggregated software module response 214.

Note that in one embodiment, the present invention utilizes AMD or a similarly well-defined module definition scheme. A brief description of AMD follows:

The AMD Application Program Interface (API) specifies a mechanism for defining modules such that the module and its dependencies can be asynchronously loaded. There are two main functions specified by the API: require( ) and define( ). The define function defines a module. Each module has a define( ) function, which is usually the outer element of the entire module. The main purpose (other than encapsulating the module implementation) of the define( ) function is to specify the module's dependencies.

Consider now the following pseudo code:

```
define("alpha", ["dep1", "dep2"], function(dep1, dep2) {
    return {
        dep1Something: function(arg) {
            return dep1(arg);
        },
        dep2Something: function(arg) {
            return dep2(arg);
        }
    };
});
```

This pseudo code defines a module named "alpha". The module (i.e., software module) depends on two other modules, "dep1" and "dep2". If "alpha" is needed in an application, then the application will call the function "require( )", thus specifying "alpha" in the list of modules that it needs. When the AMD loader has loaded "alpha" and its dependencies, then "alpha"'s define function callback will be called by the loader and the value returned will be the value of "alpha". After all of the required modules have been loaded and defined, then the require callback function is called:

```
require(["alpha"], function("alpha") {
    alpha.dep1.dep2.Something("hello"); } ) ;
```

In the preceding example, when require( ) is called, the loader will load module "alpha" (in file alpha.js). After "alpha" has been loaded, the loader will see that "alpha" requires modules "dep1" and "dep2". The loader will send out requests for these two modules, and once they are loaded and all dependencies have been resolved, then the loader calls the callback function that was specified as the second function argument in the call to require.

One embodiment of the present invention is implemented in an AMD module aggregation service. The service utilizes an AMD loader extension that allows a custom loader module to aggregate requests for multiple modules, such as the two modules that are listed as alpha's dependencies, in a single request to the aggregation service. The two modules will be delivered to the loader in the response.

As part of the aggregation service's initialization, it performs an analysis of the module dependencies for all of the AMD modules that it serves and produces a dependency graph that allows it to determine the complete set of nested dependencies for any module. The service also performs JavaScript minification (white-space and comment removal, shortening of variable names, unnecessary token removal, etc.). The JavaScript minification requires that the JavaScript modules be parsed into a tokenized form, known as an Abstract Symbol Table (AST) using a JavaScript compiler.

In one embodiment of the present invention, the AMD aggregation service takes advantage of this parsed AST to locate the require functions in an AMD module and expand the list of required modules (the first argument to the require call) so that the list includes the explicitly specified dependencies, plus all of that list's nested dependencies. This is done as part of the JavaScript minification process. So, using the above example, the JavaScript code delivered by the aggregation service for the module containing the require call would look like the following (not including any JavaScript minification for clarity):

```
require(["alpha", "dep1", "dep2"], function(alpha) {
    alpha.dep1.dep2.Something("hello");
});
```

Note that the module names "dep1" and "dep2" have been added to the require list by the aggregation service. They did not appear in the original JavaScript source for the module. Now, when this require call is executed on the client, the loader will attempt to load all three modules, allowing the aggregation service to combine all three modules in a single request and avoiding the cascaded request resulting from dependency discovery that a user would get without module list expansion. If any of the modules have been previously loaded, then the loader simply will not include those modules in the request. This scheme allows the AMD loader on the client to be in charge of maintaining the list of loaded modules, without having to share this information with the server or requiring the server to separately maintain the list of modules that have already been delivered to the client.

Figure 3:
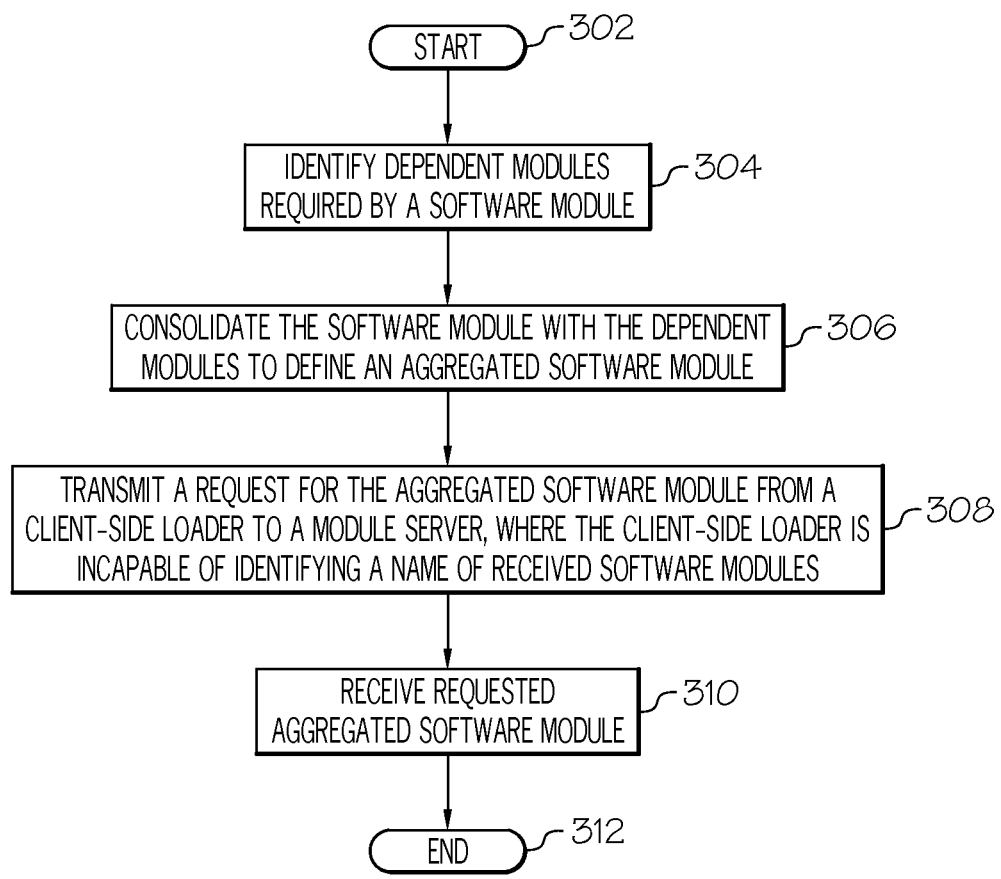
FIG. 3 is a high level flow chart of one or more exemplary steps taken by a processor or other computer hardware to retrieve nested software modules in accordance with one or more embodiments of the present invention.

With reference now to FIG. 3, a high level flow chart of one or more exemplary steps taken by a processor or other computer hardware to retrieve nested software modules in accordance with one or more embodiments of the present invention is presented.

After initiator block 302, a client computer identifies dependent software modules (e.g., "dep1" and "dep2" described above) that are required by a software module (e.g., "alpha" described above), as described in block 304. As described in block 306, the client computer (e.g., through the use of the loader 204 and nested resource aggregation logic 206 shown in FIG. 2) aggregates the software module with the dependent software modules to generate an aggregated software module, which is a nested resource of software modules. As described in block 308, the client-side module loader (e.g., loader 204 in FIG. 2) in the client computer then transmits a request for the aggregated software module to a module server. As described herein, the client-side module loader, which in one embodiment comports with the AMD specification described herein, is incapable of identifying a name of received software modules from the module server. Thus, the request simply assumes that whatever is returned from the software module server is what the loader requested, with no embellishments, additional modules, removed modules, etc. Since the client aggregates all needed modules, primary and dependent, into the request, then the returned dependent modules are not unexpected to the loader (i.e., the requested modules and the returned modules are the same).

In one embodiment, the module server is blocked from returning additional modules in response to a request for a particular module. That is, the module server (e.g., software module server 212) is limited to returning only what modules are requested, and is unable to return any modules (i.e., dependent modules) that are required to execute the requested module. Thus, it is incumbent on the client computer 202 to determine which modules are "dependent modules" that are required to execute the "primary module".

Note that in one embodiment, the module server recognizes the aggregated software module using AMD specification commands without any plugins. That is, a plugin is defined as an embellishment to the AMD specification that would provide custom logic for loading a module. Loader plugins can delegate loading of a module to the default loader so it is loaded as other modules though the aggregation service after potentially modifying the requested module name or else subsequently providing post-processing of the loaded module data, or it can implement its own loading logic, potentially loading the module from the same or a different server, without the use of the aggregation service. However, such a workaround would require 1) the plugin to be installed on both the client computer as well as the module server, using 2) a programming language that both the client computer and the module server understand (i.e., both systems have been loaded with the same programming language that is used by the plugin). The present invention overcomes this issue, since the client computer simply expands the requested modules using standard AMD commands, which the module server understands without any plugins or other embellishments.

As described in block 310, the client-side module loader in the client computer receives the requested aggregated software module. As described above, the requested aggregated software module has no identification. However, this does not matter, since the request from the client computer included the requisite dependent software modules. In one embodiment, these received software modules (both the primary and dependent modules) are then used to populate a software framework.

As described herein, in one embodiment, the client-side module loader utilizes asynchronous module definition (AMD) specification commands to define and consolidate the primary software module with the dependent software modules to generate the aggregate software module. As discussed above, the AMD specification commands include a "define" command to identify the dependent software modules that are required by the software module, as well as a "require" command to consolidate the software module with the dependent software modules to generate the aggregated software module.

Note that in one embodiment, in response to the client-side module loader determining that a particular dependent software module from the dependent software modules has been previously loaded onto the client computer, the client computer removes that particular dependent software module from the aggregated software module before transmitting the request for the aggregated software module to the module server. Thus, the client computer only requests the dependent software modules that are needed by the primary software module.

The process depicted in FIG. 3 ends at terminator block 312.

Note that the present invention allows the client to avoid requesting modules that it has already received. That is, under one embodiment of the present invention, the list of modules that the client sends to the server is expanded to include only nested dependencies that the client does not already have, instead of including in the response nested dependencies that the client did not explicitly request.

The present invention further solves the problem of managing module dependencies in a dynamic module aggregation service that performs dependency expansion to include nested-dependencies. It does this by modifying the module source that is served so that the list of modules requested by the loader on the client includes the expanded, nested dependencies, rather than a traditional approach of the module server adding nested, expanded, dependencies that were not explicitly requested by a client in the server response. This solution avoids the drawbacks of the alternative approaches mentioned above because the server does not have to maintain any client state and the client does not have to inform the server of the modules that have already been loaded in each request.

Note that, in various embodiments, the present invention eliminates the need for the server to maintain client states so that it can remember which modules have already been sent to the client (in order to avoid sending duplicate modules), and makes it possible to support client-side module loader customizations (without any AMD loader plugins). By expanding the require list in the delivered code to include the list of nested dependencies, the application provides the loader with all of the module names that are needed by the application, including dependent module names, so that the loader can request from the server all of the required modules in a single request, without needing to discover new dependencies as modules are loaded and make additional, cascading requests when new dependencies are discovered. At the same time, the loader can decide which modules do not need to be requested, either because they have already been loaded onto the client, or because they are not needed for the particular platform/browser or application feature, as determined by a loader. When the request for modules is made by the client to the server (as a result of the modified require function being called on the client), the server needs only to aggregate the list of modules requested by the client. There is no need for the server to compile and include nested dependencies in the response because the nested dependencies that the client needs are specified in the request.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of retrieving a nested resource of software modules, the computer-implemented method comprising:
    identifying, by a client computer, dependent software modules that are required by a software module;
    consolidating, by the client computer, the software module with the dependent software modules to generate an aggregated software module, wherein the aggregated software module is a nested resource of software modules;
    transmitting, from a client-side module loader in the client computer to a module server, a request for the aggregated software module, wherein the client-side module loader is incapable of identifying a name of received software modules from the module server, and wherein the module server is blocked from returning additional software modules in response to a request for a particular module;
    receiving, by the client-side module loader in the client computer, a requested aggregated software module, wherein the requested aggregated software module has no identification;
    utilizing, by the client-side module loader, asynchronous module definition (AMD) specification commands to define and consolidate the software module with the dependent software modules to generate the aggregate software module, wherein the AMD specification commands comprise a "define" command to identify the dependent software modules that are required by the software module, wherein the AMD specification commands further comprise a "require" command to consolidate the software module with the dependent software modules to generate the aggregated software module, wherein the module server recognizes the aggregated software module using AMD specification commands without any plugins, wherein a plugin is defined as an embellishment to an AMD specification that provides custom logic for loading a module using loader plugins, wherein the loader plugins delegate loading of the module to a default loader, wherein use of the loader plugins requires the loader plugins to be installed on both a client computer that is hosting the client-side module loader as well as the module server, and wherein use of the loader plugins requires use of a same programming language that has been loaded on both the client computer and the module server;
    removing, by one or more processors, white-space and comments from the aggregated software module;
    shortening, by one or more processors, variable names within the aggregated software module;
    parsing, by one or more processors, the aggregated software module into a tokenized form using a compiler, wherein parsing the aggregated software module creates a parsed Abstract Symbol Table (AST);
    utilizing, by one or more processors, the parsed AST to locate require functions in an AMD module; and
    expanding, by one or more processors, a list of required modules used by the aggregated software module, wherein require functions specify dependent software modules required to execute the software module, and wherein the list includes nested dependencies of modules within the list.

2. The computer-implemented method of claim 1, further comprising:
   populating, by the client-side module loader, a software framework with the requested aggregated software module.

3. The computer-implemented method of claim 1, further comprising:
   in response to the client-side module loader determining that a particular dependent software module from the dependent software modules has been previously loaded onto the client computer, removing the particular dependent software module from the aggregated software module before transmitting the request for the aggregated software module to the module server.

4. The computer-implemented method of claim 1, wherein the module server is limited to returning only what modules are requested, and wherein the module server is unable to return any dependent modules that are required to execute the requested particular module.

\* \* \* \* \*